INVENTORS
HAROLD W. BURNEY
PAUL E. BICKEL
WILLIAM J. KOENECKE
BY

ATTORNEYS

INVENTORS
HAROLD W. BURNEY
PAUL E. BICKEL
WILLIAM J. KOENECKE
BY
Kane, Dalsimer, Kane & Smith
ATTORNEYS

United States Patent Office 3,421,618
Patented Jan. 14, 1969

3,421,618
SHOT CLASSIFYING APPARATUS
Harold W. Burney, Hackensack, N.J., Paul E. Bickel, Santa Monica, Calif., and William J. Koenecke, Glen Rock, N.J., assignors to Metal Improvement Company, Hackensack, N.J., a corporation of New Jersey
Filed Aug. 1, 1966, Ser. No. 569,131
U.S. Cl. 209—112         8 Claims
Int. Cl. B07c 9/00

ABSTRACT OF THE DISCLOSURE

This invention relates to classifying apparatus particularly adapted for segregating shot adapted for peening operations. It also provides by means of a plurality of generally helically shaped flight members for removing contaminants as well as dirt and foreign matter from the shot. Through the use of associated screening apparatus, shot of different size can be selected prior to sorting.

---

This invention relates to classifier apparatus for segregating and separating various size shot for peening operations after removing contaminants, dirt and foreign materials which usually tend to impair selection.

In many peening operations, it is particularly desirable that the shot which are to be projected against the material to be treated shall be of substantially spherical configuration and shall also be of substantially uniform size for each different operation.

Some articles require peening by different size shot at different areas. Under such circumstances, the work is often treated by directing different size shot from different nozzles or jets to different parts of the work, in which event, shot of different sizes become intermingled as used shot and must be segregated for reuse conditions. At other times, shot of different sizes occasionally become inadvertently intermingled and should be separated to the proper size and shape, prior to use. For these reasons, extremely careful sorting and classifying, as well as the removal of imperfect shot from the batch is of great importance. Shot which are damaged or roughened or in any way broken and having rough edges cannot well be used in the operation. Unless rapid sorting and segregation can be provided, replacement of material, with resultant needless expense, comes about. The invention here to be described makes it possible to provide for the continued reuse of shot while, at the same time, it insures that the shot size seected shall be of the desired substantially spherical shape and free from rough edges, as well as of the chosen and selected size, with all contaminants removed and worn shot discarded, as necessary.

The invention is practised by providing for reclassifying and sorting the shot through the use of units which first screen out foreign particles and bodies of a size usually larger than the shot to be worked upon. The so-screened composition is then supplied to a cleaning unit which segregates dust, dirt and lightweight refuse, such as paper scraps and other similar material, from the mass after which the sorting, segregating and exclusion of imperfect material is carried on. Following this the shot are grouped and segregated as to size. Then, the sized shot are selected as to quality.

As the invention is constituted, one of its main objectives is that of providing a classifying structure for segregating shot of random size into uniform size masses and, at the same time, to provide for removing from the initial mix any irregular or foreign bodies and, in addition, removing dust and dirt from the shot prior to sorting so that the selection can best be achieved and the selection apparatus shall not foul from foreign bodies.

In its preferred embodiment, the invention provides for screening the shot to be selected and then feeding this shot which may be of random size and, even then, usually including some foreign bodies and dirt through a cleansing unit through which air is drawn and which thus removes substantially all dirt and dust from the shot prior to size and shape separation. Following the cleaning, the shot and any foreign bodies still therewith associated are supplied in any desired fashion to a separator or screening unit adapted to make a general classification of the shot in accordance with size and weight but not necessarily excluding irregular or roughened shot and often containing small foreign bodies not suitable for the peening operation. Following this broad selection of shot size, the shot are fed or directed into hoppers from which they are supplied to classifier units each having a plurality of flights along which different shot are passed. The flights are arranged about a central support column to follow a substantially spiral or helical path from the top to the bottom, with the pitch of the spiral or helix being carefully selected so that shot may move gravitationally from the top to the bottom of the classifier. Each flight is equiangularly spaced about the support column and each has a like helical or spiral pitch.

Shot directed into the several flights at the topmost portion leave at the lowermost portion. Each flight comprises what may generally be considered to be a ribbon-like surface of selected width extending from top to bottom of the support. Illustratively, the ribbon may be formed from a strip of metal having one edge secured to the support with the attachment following the stated spiral or helical path thereabout to make a plurality of complete turns about the support column from its top to bottom. The free edge of the ribbon-like structure extends outwardly and is inclined to the central support column at any desired selected angle usually chosen within a range of 40° to 50° to the normal.

The width of the flight surface extending outwardly from the central support column is such that with the gravitational fall of the shot to follow the spiral path from top to bottom, the shot supplied to the flight tend to roll along the flight and, with the drop from the top (the point at which the shot are introduced into the flight) to the bottom, shot of desired size roll along the flight surface. If the shot are smooth and round so as to roll easily by reason of having single point contact only with the surface, they are subject to the effects of both centrifugal force tending to act in an outward direction along a path normal to the support and to the force of gravity acting in a downward direction. The vectorial sum of the forces acting upon the shot is such that shot of a size for which the flight unit width is particularly designed will ride up along the flight surface and spill over the edge thereof prior to the time of reaching the lowermost portion. Shot which are rough and which have sharp or roughened surface portions introduce greater amounts of friction with the flight surface than do the spherical and substantially perfectly formed shot. In practise, the greater the flight width, the larger the shot size to be selected.

The result is that any burred, roughened or uneven peripheral formation of shot produces frictional effects of a magnitude acting against the flight surface which is sufficient to preclude such imperfect shot from riding outwardly far enough on the flight surface to pass beyond the outer edge. Such imperfect shot then tend to remain closer to the surface of the support column about which the flight is moutned. Finally, when such articles reach the bottom of the spiral or helix, they are collected at a point at which the flight terminates.

A catch pan is also arranged to surround all of the flights. It is also held from any selected number of upright supports and follows likewise a substantially like pitch along the helical or spiral path from top to bottom. The catch pan has its surface area generally substantially parallel to the flight surfaces. The outer edge of this spirally arranged catch pan is provided with a substantially vertical or upright upstanding edge to hold shot from passing off its edges. The inner edge of the catch pan is held in contact with the same upright support column as that about which the flights are mounted. Also, the catch pan is positioned between selected flight members in a manner to be clear of each flight and yet to be interposed between adjacent flights. All shot which overflow the edge of any flight are caught by the catch pan. Likewise, as soon as the catch pan is reached, the shot tend to roll thereon along its upper surface and follow a path leading toward the outer edge and the upstanding rim.

The catch pan in its interleaved relationship to the flights starts generally as the first or uppermost flight set or cell starts its second turn of the helix. The catch pan is then spaced uniformly between the top of the first helical member as it starts its second turn and the bottom of the last member of the flight set or cell.

The perfect or spherical shot again roll with only one point contact on the surface of the catch pan and are able to roll along the flights and the catch pan with minimal friction so that this shot in proceeding over several convolutions of the spiral or helix from top to bottom all gather toward the outer edge of the catch pan and in a region generally adjacent to its upstanding edge. This precludes any further separation distance occurring between the central support column and the shot. At the bottom of the catch pan path the good short are removed by falling into a collector bin and are ready for immediate reuse.

Toward the inner edge of the catch pan and in a region generally adjacent to the upright support, a further collector duct is provided to collect shot which are not quite good enough to be reused for all purposes but which may be mixed with some shot which are of adequate size but of less perfect configuration which may have spilled over the edge of one of the flight paths. Also, shot which are perfectly reusable at times for one or another reason may not have reached the pan edge and if collected with less perfect shot can be resorted. Generally speaking, the pitch of the catch pan corresponds to that of the spiral or helix except as will be later explained for certain parts of the flight paths and for a region at the lowermost or discharge end where the slope may be reduced.

All shot graded and separated according to the stated procedure are then gathered into hoppers or supply bins for reuse at a later time. All shot so gathered are cleaned by reason of the cleaning operation first occurring. All short so gathered are also free from contaminants and are thus segregated to provide clear distinction between perfect and imperfect components.

The invention has been illustrated in accordance with one of its preferred forms depicted by the accompanying drawings wherein.

Figure 1:
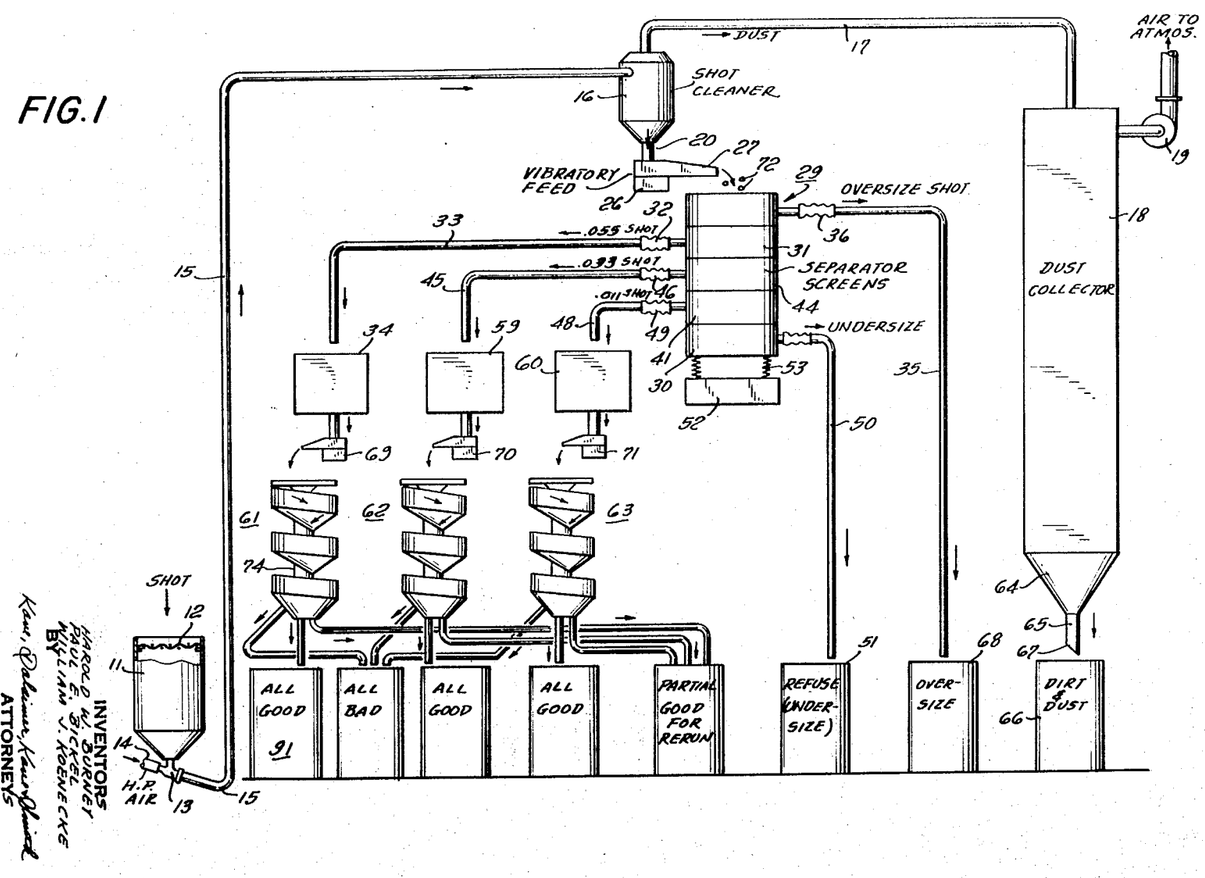
FIG. 1 is a schematic showing generally in the form of a flow diagram to represent the sequence and manner of segregating usable shot from unusable of different size characteristics.

Referring now to the drawings for a further understanding of the invention FIG. 1 may first be considered. This is a schematic flow diagram to indicate the operational sequence for segregating shot of different types and sizes. The shot (not identified by legend in FIG. 1) are first supplied into a shot hopper 11 in any desired fashion. The hopper has a foraminate screen 12 stretched across its upper portion. The screen is of a mesh sufficiently coarse to pass all shot sizes that are desired for use in a peening operation to be undertaken but sufficiently small in mesh size to screen out all refuse items which, if permitted to be directed toward the shot ejecting jets or nozzles, might cause a collecting or jamming of such elements.

The infalling shot fed into the supply hopper 11 are fed out therefrom, as desired, and then directed outwardly through the conventionally indicated shot ejecting chamber 13. Air or fluid under pressure from any desired source (not shown) is supplied through the inlet tube 15 into the ejection chamber 13. This forces the dispensed shot outwardly from the chamber and upwardly through the tube 15 to a cleaner and separator unit 16.

The separator is a generally cylindrical shaped unit into which the shot input supplied from the hopper 11 falls at the end of its passage through the tubular member 15. A partial vacuum is maintained in the separator 15 through the connection by way of the connecting tube 17 into the dust collector 18 to which a suction blower, conventionally represented at 19, is connected. Dust and dirt or other contaminants which are lighter than the input shot to the separator, pass through the connecting tube 17 and into the collector 19, as will be later discussed. Shot and other parts or components of comparable size fall downwardly by gravity through the separator and through an outlet gate, as conventionally represented at 20.

Any shot passing beyond the outlet gate 20 fall upon a vibratory feed element conventionally represented at 26. The vibratory feed element may be of any desired and well known type, illustratively, one of the many types manufactured by Eriez Magnetics of Erie, Pa. and sold and marketed under the designation of "Vibratory Feeders." The feeder 26 is of such type that shot falling upon its tray element 27 appropriately vibrated by a vibrating mechanism (not shown) pass off from the open outer end of the tray into a screen separating unit schematically represented at 29.

Figures 7, 8, 8A, 9:
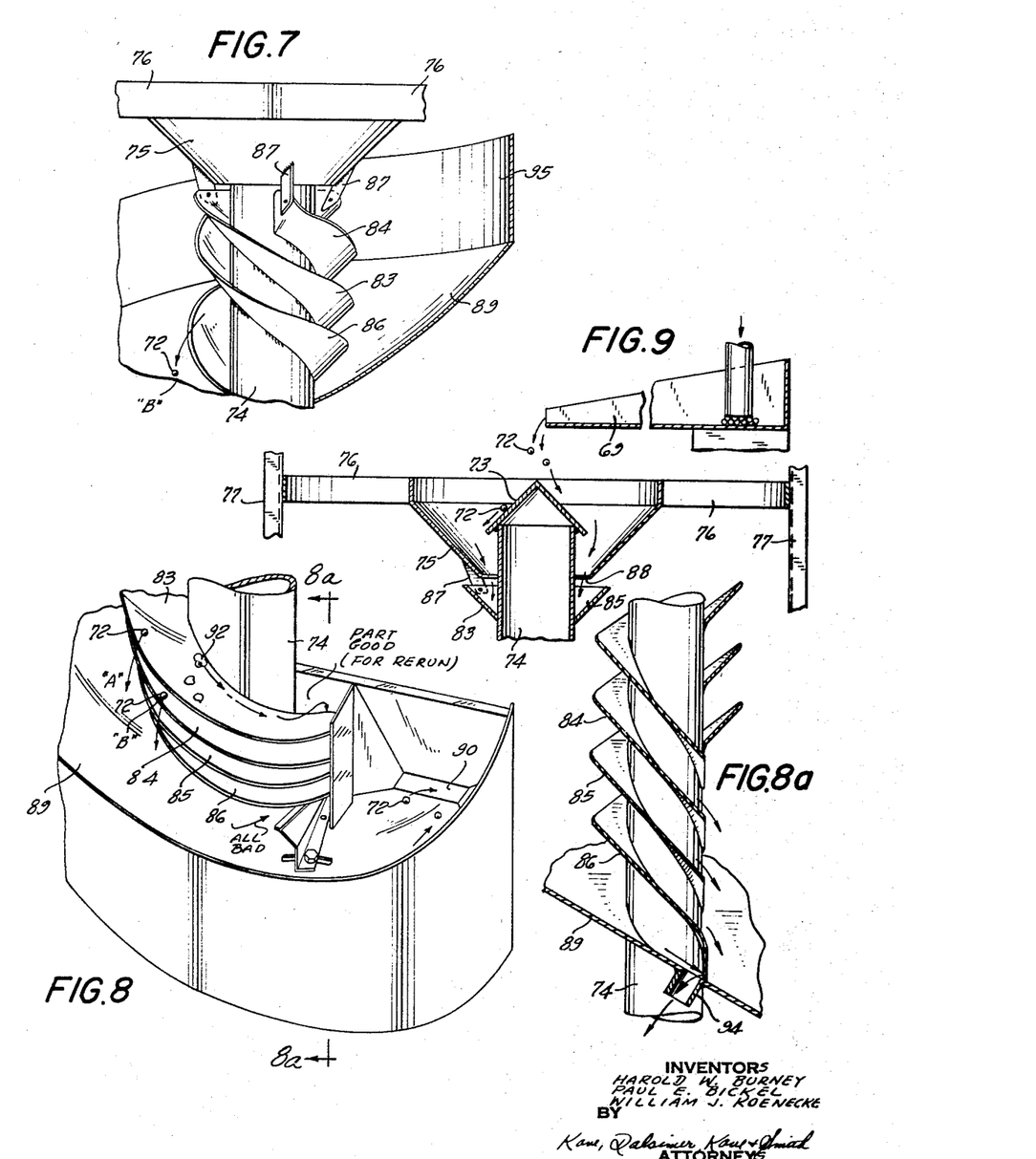
FIG. 7 is an elevational view of a semi-isometric type particularly to show the upper portion of the separator and to show the manner of attaching the separate flights and the pan around the central support column, as well as to show the relationship of the flights to the shot slide.
FIG. 8 is an enlarged sectional view also of a semi-isometric type of the lower portion of the separator to show the lower section of the multiplicity of separate flights and the catch pan showing the manner of selecting usable short from unusable.
FIG. 8a is a section on line 8a—8a of FIG. 8 showing particularly the termination of the flights relative to the catch pan at the discharge region.
FIG. 9 is an elevational view, partly in section, of the upper portion of the classifier structure to show the manner of supplying shot for classification to a conical distributor for feeding the different separate flights.

For the most part, the outlet gate 20 includes a short feed tube or discharge spout which extends into the region of the vibratory feed element. This provides an arrangement whereby the shot which reach the vibratory feed element tend to pile up to a very minor extent and soon assume an angle of repose such that no further flow can occur. As soon as operation of the vibratory feed is initiated, however, the shot are jarred loose from the fixed position and immediately feed out of the spout or tray feed end 27 of the vibratory element. It is thus possible to use the combination not only as a feed element but also as a valve control. Reference may be made to FIG. 9 for a further description and it may be understood that this general arrangement is usually preferred for all vibratory feeds herein disclosed although operation is not conditioned thereupon.

The screen separator is of any well known type having a plurality of separated screening components positioned one above the other thereby to make size selections, as indicated. The screening components are so arranged that each has a transverse mesh or foraminate screen contained therein. The screens progressively have meshes of finer size moving from the top to bottom. The spout or feed tray 27 provides a loading source from the top down to the bottom in the lower section 30 where substantially only undersized shot or refuse remains. Illustratively, the shot size selection provided may be such that oversize shot pass out through the upper section. Shot of the largest size to be used in the operation, shown illustratively as a size 0.055 inch, pass out through the first or upper separator section 31. These shot then pass through the flexible coupling or boot 32 to the tube 33 from the open end of which the shot pass into a feed hopper 34. Any oversize material that may have passed through the separator 16 has been removed by way of the upper tube 35 through flexible boot connection 36 to the screen separator 29 prior to selection in the separator 31. The middle size shot (here illustratively assumed as size 0.033 inch) are selected in the middle section 44 and are directed outwardly through the tube 45 which connects to the separator section by way of the boot 46. The smallest size shot (illustratively size 0.011 inch) are separated in the section 47 and supplied through the tube 48 connected to the separator by the boot 49.

Anything smaller than the smallest size shot desired is passed along to the lowermost section 30 and fed outwardly as refuse through the boot and tube 50 into a collection bin 51. The screens (not shown) contained within the separator may be vibrated to provide rapid movement of the shot through the separating unit. Vibration to the separator is provided by way of the conventionally represented vibrator motor 52 which, through resilient connections 53, vibrates all of the foraminate screens. The collected shot of various size are supplied into the tubes 33, 45 and 48 and thence into the supply or feed hoppers 34, 59 and 60 in approximately the desired size for utilization. It is important here to note that irregular size or foreign bodies cannot be removed unitl the supply is first screened as to size. However, even the shot supplied along these paths after screening as to size may be of the approximate size, many of the shot may be broken, have rough or flattened portions on one or more surfaces so as to lack substantially true spherical outer configuration and so forth. Such shot are not desirable for peening use and, therefore, should be segregated from completely usable shot. Other shot may be decidedly undersize and have passed into the large size tubular passage by imperfect sorting.

Through the use and practice of the invention herein to be described, the shot of different approximate size are directed to three or more separate spiral classifier units 61, 62 and 63 according to the size illustratively selected for the purpose of description. The number of separate classifying units may, of course, vary as desired but, principlewise, the operation, as herein to be described, will be understood to be similar for each size shot. The number of separators and the number of flights or cells can vary widely. As a general rule, the more flights, the greater the output. Thus, the examples herein to be given are to be regarded as purely illustrative and not limiting. Very general reference will be given in this connection to the particular form of classifier units but detailed reference will be given in respect of the discussion of various other figures of the drawings, particularly FIGS. 2, 3, 5, 7, 8, 10 and 13 as an illustration.

Prior to directing the shot into the separator, the dust is removed by the separator 16, as above discussed. This dust passes into the dust collector 18, also discussed. The dust flowing into the dust collector, as can be seen more particularly from consideration of FIG. 14, enters by way of the tubular inlet or connecting tube 17. Within the collector unit 18, as can be seen more particularly from FIG. 14, numerous separating tubes are provided. Dust is collected in the lower funnel-shaped portion 64 and passes outwardly through the outlet tube 65 into any desired form of collection hopper 66. Normally, the lower portion of the outlet tube 65 is provided with a vibrator valve 67 of any desired well known form which normally tends to remain spring closed. It will automatically open to discharge dust when the accumulated weight of the dust is sufficient to overcome the spring pressure tending to maintain the unit closed (see FIG. 14).

The undersized shot and any undesirable small refuse are collected in the collection bin 51. The oversize shot which are passed outwardly through the tube 35 are collected in the bin 68. Generally speaking, the collection obtained in all of the bins 51, 68 and 66 may be classed as refuse although it is often desirable, particularly in connection with the oversize material in the bin 68, to make a further separation in order that small usable size shot may not have failed to find their way into a collection bin from which they may be reused.

Oversize shot particularly adapted for different forms of peening operations all flow to the spiral classifiers 61, 62 or 63, as the case may be.

A second group of vibratory feeds 69, 70 and 71 is located at the outlet end of each of the feed hoppers 34, 59 and 60. Similar to the explanation given with respect to the vibratory feed element 26 and the collection tray 27, held thereon, each of the vibratory feeds 69, 70 and 71 may be of the general form and style already explained and the operation may likewise be as explained. Under these circumstances, shot which have been discharged from the hoppers 34, 59 or 60 (illustratively) are supplied in part to the classifying units.

The shot are fed into the classifying units in any desired fashion (see FIG. 9) where the shot are schematically represented at 72. The shot are adapted to be supplied to the classifying units by falling from the vibratory feeds toward the apex of a conical distributor 73. The distributor is positioned and secured, as by welding, to the upper end of a support element 74 (usually tubular to reduce weight) which extends upwardly approximately centrally of the spiral or helical classifier unit. Any shot 72 falling onto the conical distributor element 73 slides off it to impact the inner surface of an open-ended cone element 75 which is held and secured to extend arm members 76 which, in turn, are secured to frame members or uprights 77.

Shot which are supplied in the region of the apex of the conical member 73 generally roll along the outer conical wall and then fall to the inner surface of the conical member 75 or, in a few cases, drop directly from the edge to the conical member 73 to the selector means. Thus, shot which strike the inner surface of the inner cone surface 75 or which fall directly downwardly from the conical distributor 73 are received upon one of the flight surfaces 83, 84, 85 or 86, as the case may be. For this description, it will be assumed that four separate flights are arranged about the central distributor support element 74, although, as already stated, more or even less flights can be used within the principles of this consideration. These flights (if the assumed number is four) then are arranged with a 90° separation between them (see, for instances, FIG. 7).

Each of these flights is generally formed of a metal strip about two to six inches wide (although this is stated illustratively and not in a limiting sense). One edge of each metal strip is fitted and held adjacent to the distributor support element 74. The other edge extends outwardly. The surface of the strip which abuts the support element 74 is held adjacent to it and, for the most part, approximately 45° to its axis. Each flight is arranged in precisely the same fashion with a 90° separation circumferentially between the flights in the example illustrated by the drawings which show four separate flights.

The upper and outer edge of each strip 84 which terminates in the region where shot from the conical distributor are adapted to be supplied is held by a strap or other suitable form of fastener 87 and secured to the lower surface of the conical member 75 thereby to maintain the desired separation and the selected positioning of the flight members. The inner edge of each flight strip is held to the support. As can be seen from FIGS. 2 and 3, the flight members extend substantially from the top to the bottom of the distributor support element. All flight members are similarly secured and similarly positioned relative to the distributor support surface. Under the circumstances, when shot are supplied from any of the vibrating feeds, such as 69, the shot reach the upper surface of one of the flight members by way of the opening 88 at the lower portion of the conical surface 75. As soon as the shot reach any one of the flight surfaces, they immediately start to fall (that is, to roll or slide) by gravity along the flight surface in the direction of the bottom of the supporting column. The incline of the flight surface permits such rolling or sliding along the member and finally (see FIG. 8, for instance) when the shot reach a position generally designated as "A" it is almost at the edge of one of the flight paths. However, at this point, the shot has not reached a velocity in the direction along which the centrifugal force is acting upon it which is sufficient to cause the shot to leave the edge of the flight path. However, at the position designated "B," it can be assumed that the force acting upon the shot is sufficient to force it over the edge of the flight path, in which event it will come to rest upon the surface of the catch pan 89. It can then proceed downwardly along the catch pan to the shot exit port 90 leading into a storage bin 91 in which the selected shot is stored.

Figure 2:
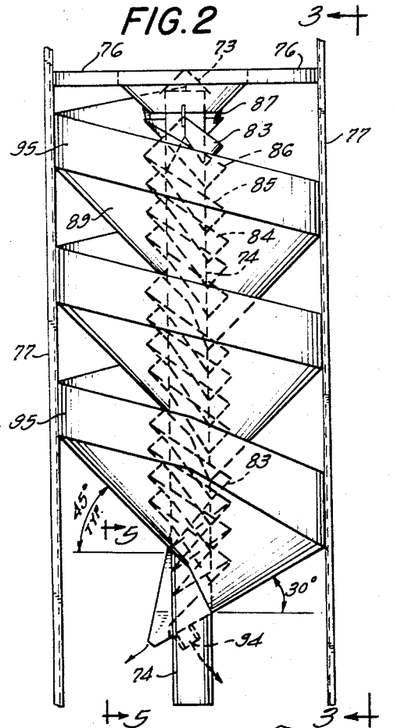
FIG. 2 is an elevational view showing one separating unit for selecting usable shot and with this, a series of separate flights onto which the shot for selection is deposited from a supply and depicting the paths followed and the relationship of the catch pan to the overall assembly.
Figure 3:
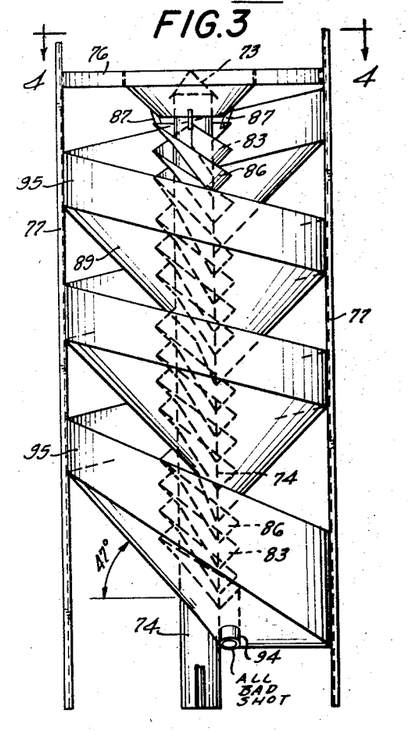
FIG. 3 is also an elevational view of the structure of FIG. 2 but looking at FIG. 2 from the direction of the arrows on the line 3—3.

As can be seen particularly from FIGS. 2 and 3, the various flight paths are shown in dotted outline relationship. This is because of the multiple spiral or helical flights leading from the article-receiving region, where the shot are discharged from the conical distributor 73 to proceed through the sorting operation. Any shot which lack spherical shape or which have been flattened in any respect cannot ride up the slope of the flights (usually in the general range of 45°) to fall onto the catch pan 89. Such conditions are represented by the shot component 92 (see FIG. 8) which is irregular and tends to remain in a region closely adjacent to the distributor support element 74. Shot which are non-round or foreign particles proceeding to fall along the flight path are finally all collected at the bottom of the assembly after having reached a barrier or stop 93 leading into a discharge tube 94.

The shot which are deposited on the various flights after being passed off the conical distributor, as already stated, reach the flights 83, 84, 85 and 86. These flights, as above explained, are formed normally from sheets of metal and are about two to four inches wide. The group of flights then is separated by the spiral catch pan 89 having a substantially vertical upwardly extending outer rim 95. The catch pan is very substantially wider than the inner flights and, as above explained, it also is secured at its inner edge to the central supporting column. The flight members are all attached to the central supporting column so as to be equally spaced from each other. The catch pan is attached to the supporting column at a distance from the lowermost one of the first convolution of flight paths so as to be spaced also at the same distance as each separate flight. This causes a change in the spacing of the first flight compared to the last flight for the second convolution and so on.

Illustratively, if it be assumed that the flights 83, 84, 85 and 86 are each spaced two inches from each other, the catch pan 89 will be secured to the supporting column at a spacing two inches lower on the column and will be angularly positioned to correspond illustratively to the uppermost of the group of four flights. In order that the shot may freely and uniformly roll on the pan for the assumed condition, the catch pan has a spiral or helical pitch of say, ten inches and will be uniformly sloped between its uppermost point of attachment and the lowermost point of the first spiral. The intervening flight members initially assumed to be spaced from each other by two inches would, however, with a uniform pitch angle of ten inches, come into abutting relationship with the pan, particularly when, under the assumed example, it is borne in mind that the flights are assumed to be spaced two inches apart and the pitch of the pan is ten inches. Accordingly, the flights, as secured to the central supporting column, are arranged so that the pitch angle is uniform for say the first 180° of the spiral and, with the assumed example, the flight will be attached to the supporting central column at a point four inches below the point of attachment for the starting position following a 180° flight path. Following the first 180° of the flight path, with the assumed pitch of each helix or spiral being considered as ten inches, each flight must then extend along the central support column for a distance of six inches at its inner edge. This changes the pitch angle of the flight path for the second half of each spiral turn but it also precludes the establishment of contact between the separate flights and the pan. The catch pan may actually be considered in some respects as a flight but having a much wider pitch.

Giving consideration particularly to the showings of FIGS. 2, 3, 5, 7 and 8, a representation has been made to illustrate the relationship between the separate flights 83 through 86 and the catch pan 89 all of which are arranged on substantially duplicate spiral paths. From this consideration, it will be evident that shot directed from the conical distributor 73 to any one of the flights 83 through 86, progressively move toward the discharge end of the arrangement. The catch pan 89 winds itself in the spiral fashion relative to the plurality of flights always to provide separation between the bottom and top of the two nearest intervening flights. This positioning is arranged to preclude contact between the catch pan at any point and the adjacent flight member and also to provide sufficient intervening space to permit shot which move sufficiently rapidly to move off the edge of the flight to be picked up in the catch pan to be moved downwardly thereon. Shot so moving downwardly move further and further out from the distributor support element toward the outer edge of the catch pan until they come close or adjacent to the vertical or upright rim 95. It is only the substantially spherical shot which are able to acquire sufficient veloicty to move outwardly to such position. However, any shot which are not substantially precisely spherical, even though it may have acquired sufficient velocity to leave the rim of the inner flights, will not be able to move satisfactorily to the outermost position. Shot which do reach the outer edge of the catch pan 89 then travel downwardly to be discharged through the shot exit port 90 and to be picked up in the storage bin 91. Shot which travel down along the catch pan 89 but which are not completely spherical and with therefore acquire a velocity insufficient to move very far outwardly from the central distributor support element 74 are finally gathered by impacting the barrier 100, after which they are discharged through the outlet port 101. Shot which remain on the inner flights finally are collected at the end of the flight path and, as already stated, pass out through the discharge tube 94 to be supplied to one of the collector bins. While several classifier units 61, 62, 63 are shown in the flow diagram of FIG. 1, it will be understood that the general operation of each is similar. Therefore, suffice it to say that the description hereinabove given is generally applicable to all of the units but particularly adapted to the one illustrated.

Figures 4, 5, 6:
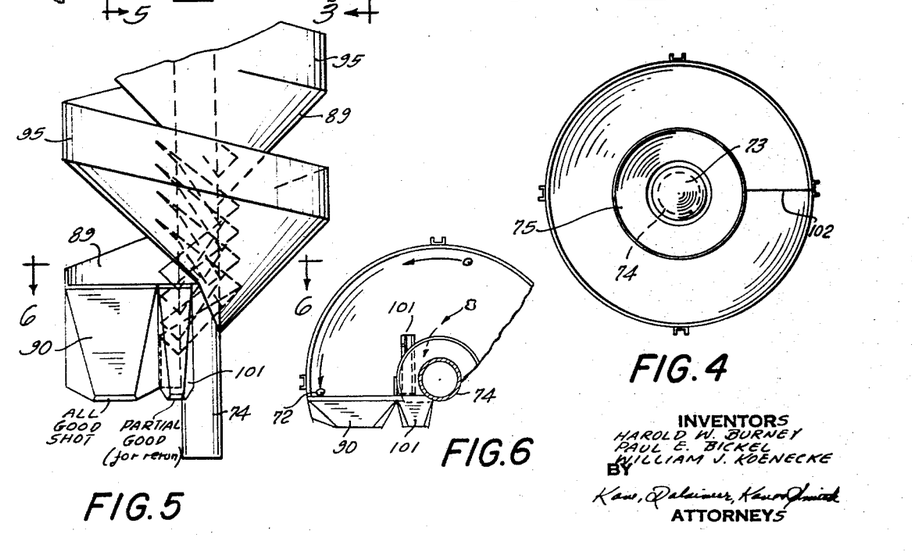
FIG. 4 is a top plan view of the structure of FIG. 3 looking from the direction of the arrows on the line 4—4.
FIG. 5 is a view of the lower portion of FIG. 2 looking in the direction of the arrows on the line 5—5 to show the discharge paths.
FIG. 6 is a partial sectional view of the lower portion of FIG. 5 taken along the line 5—5 looking in the direction of the arrows and also showing the shot discharge path.

Considering reference to FIGS. 4 and 6 in this arrangement, the edge 102 in FIG. 4 is diagrammatic of the starting point of the catch pan 89 as it progresses downwardly as shown in the remaining figures.

Figure 10:
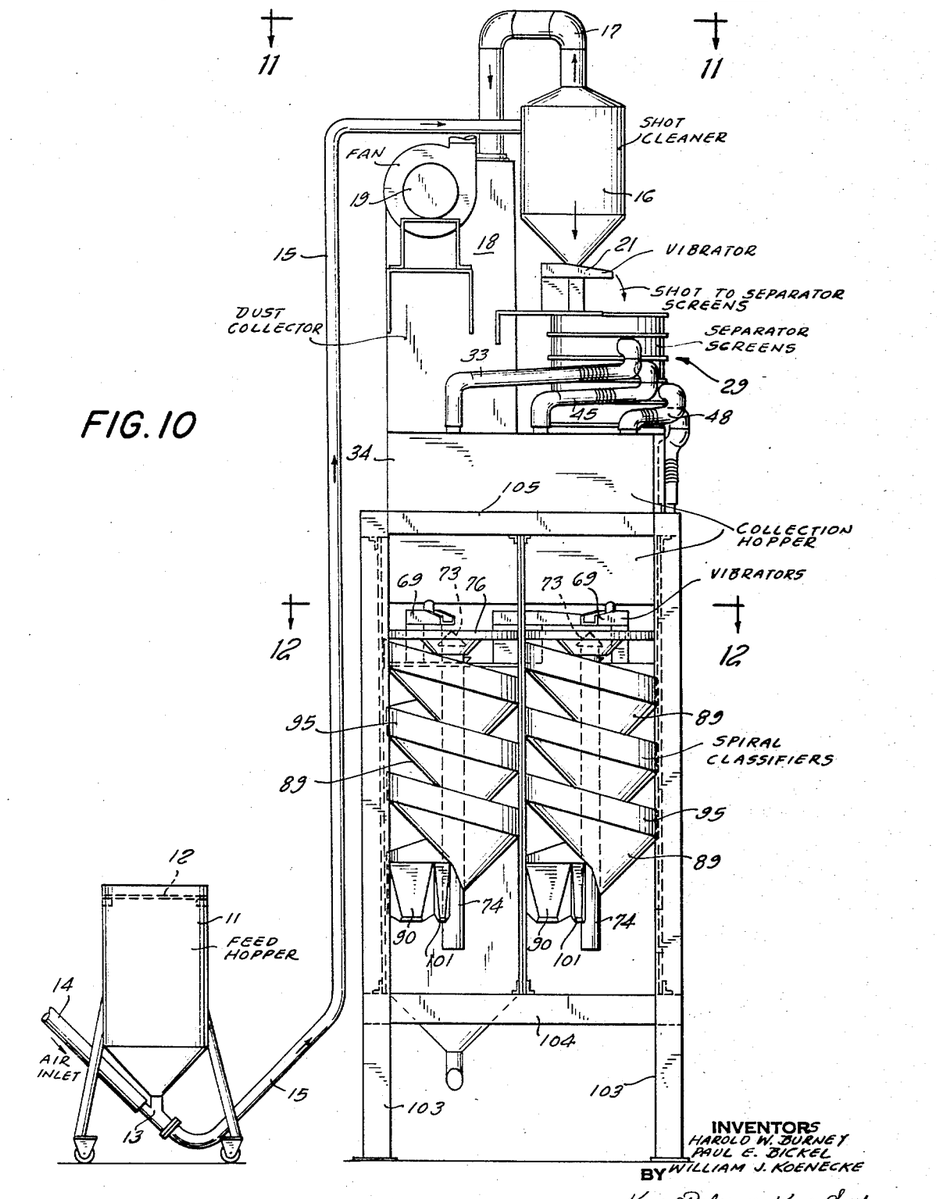
FIG. 10 is an elevational view, partly broken away, further to show the shot selection separators relative to the supply and discharge.
Figure 11:
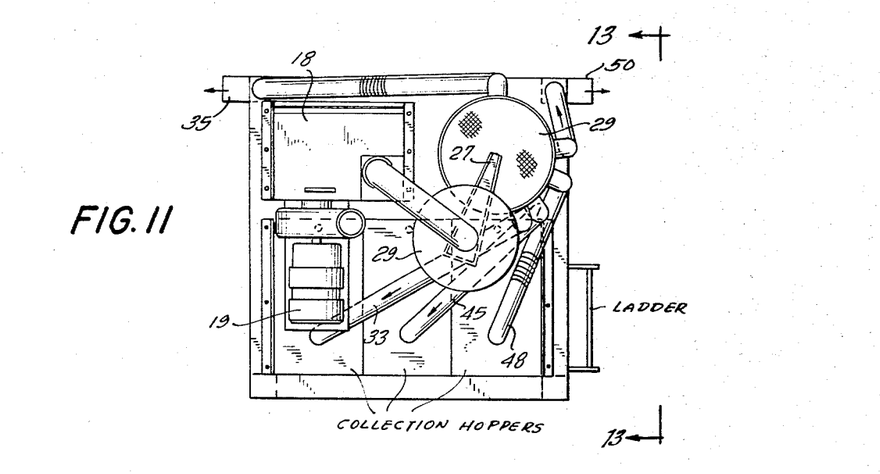
FIG. 11 is generally a top plan view of the structure of FIG. 10 looking along the line 11—11 of FIG. 10 and in the direction of the indicated arrows.
Figure 12:
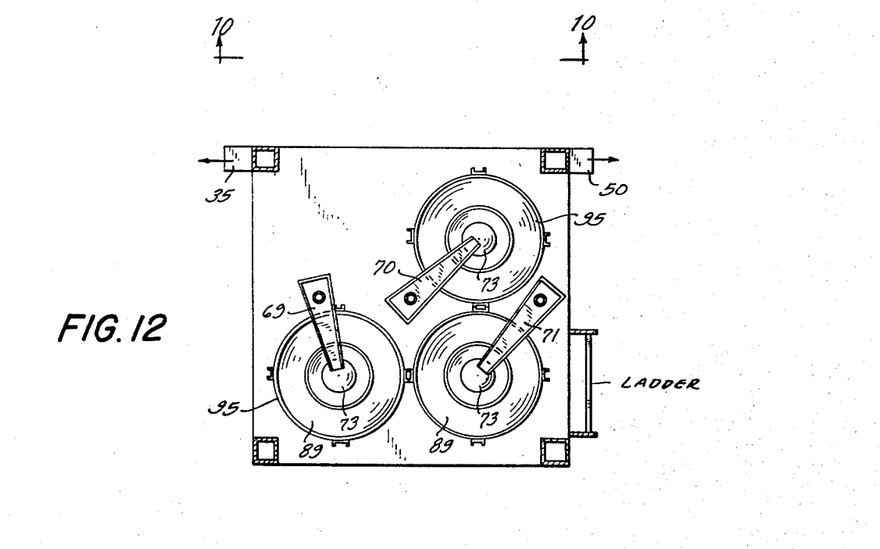
FIG. 12 is a sectional and top view taken through the structure of FIG. 10 along the line 12—12 looking in the direction of the arrows particularly to show the manner of supplying different size shot to different selecting flights.

Making reference now paritcularly to FIGS. 10 through 12, the schematically indicated operation as set forth by the flow diagram of FIG. 1 is enlarged. As described by FIG. 1, the shot from the hopper 11 which have been screened by the mesh 12 are directed upwardly to the separator unit 16. From this unit, as already explained, dust, dirt and the like are removed by way of the connecting tube 17 and supplied into the dust collector unit 18. Cleaned shot, as also already explained, are supplied to the vibrating feed 21 and then to the screen separator unit generally designated as 29. In a normal operation, the different classifications of shot as separated by the separator unit 29 are all supplied to the collecting bins which are schematically shown at 34 in this figure.

Figure 13:
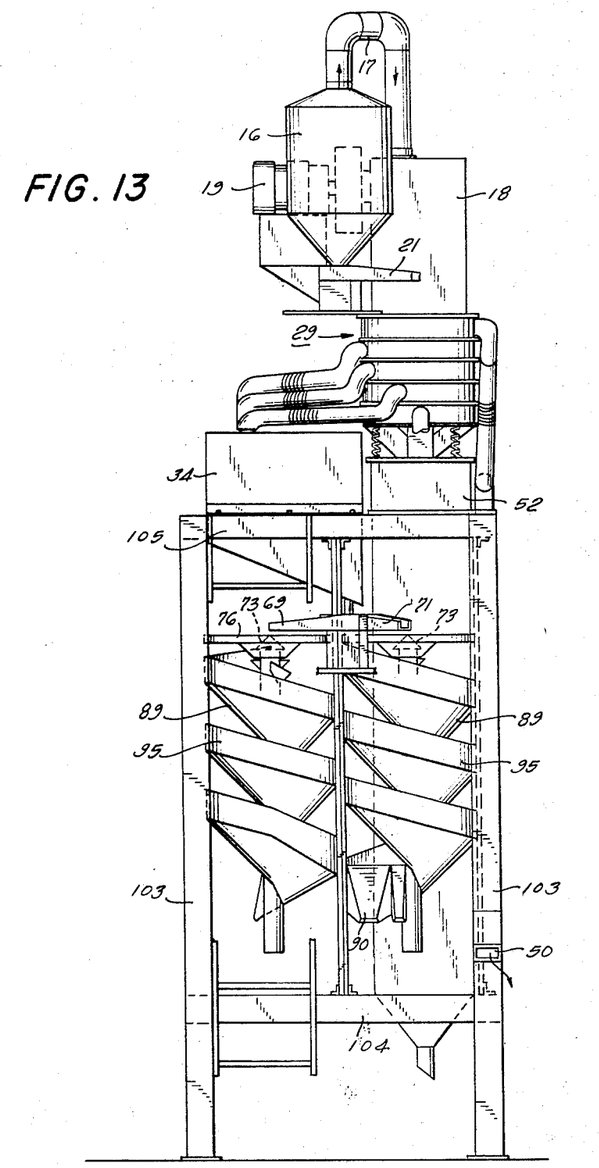
FIG. 13 is an elevational view partly broken away of the structure of FIG. 11 taken along the line 13—13 looking in the direction of the arrows.

The various flight units are positioned in any desired generally nested arrangement to carry different grades and size of shot to suitable exit ports. The complete unit is supported upon a framework composed of frame uprights 103 and supporting plate members 104 and 105. At the top of the unit, looking particularly at FIGS. 11 and 12, the various screen separators direct the shot outwardly as already explained to reach different storage bins. Following the flow diagram of FIG. 1, it will be observed that FIG. 12 shows the feed from each of the vibratory feed units into the spirally positioned classifiers. Generally similar arrangements are shown by FIG. 13 and, with the explanation above given, are considered to require no further discussion, similar parts being designated by similar legends.

Figures 14, 15, 16:
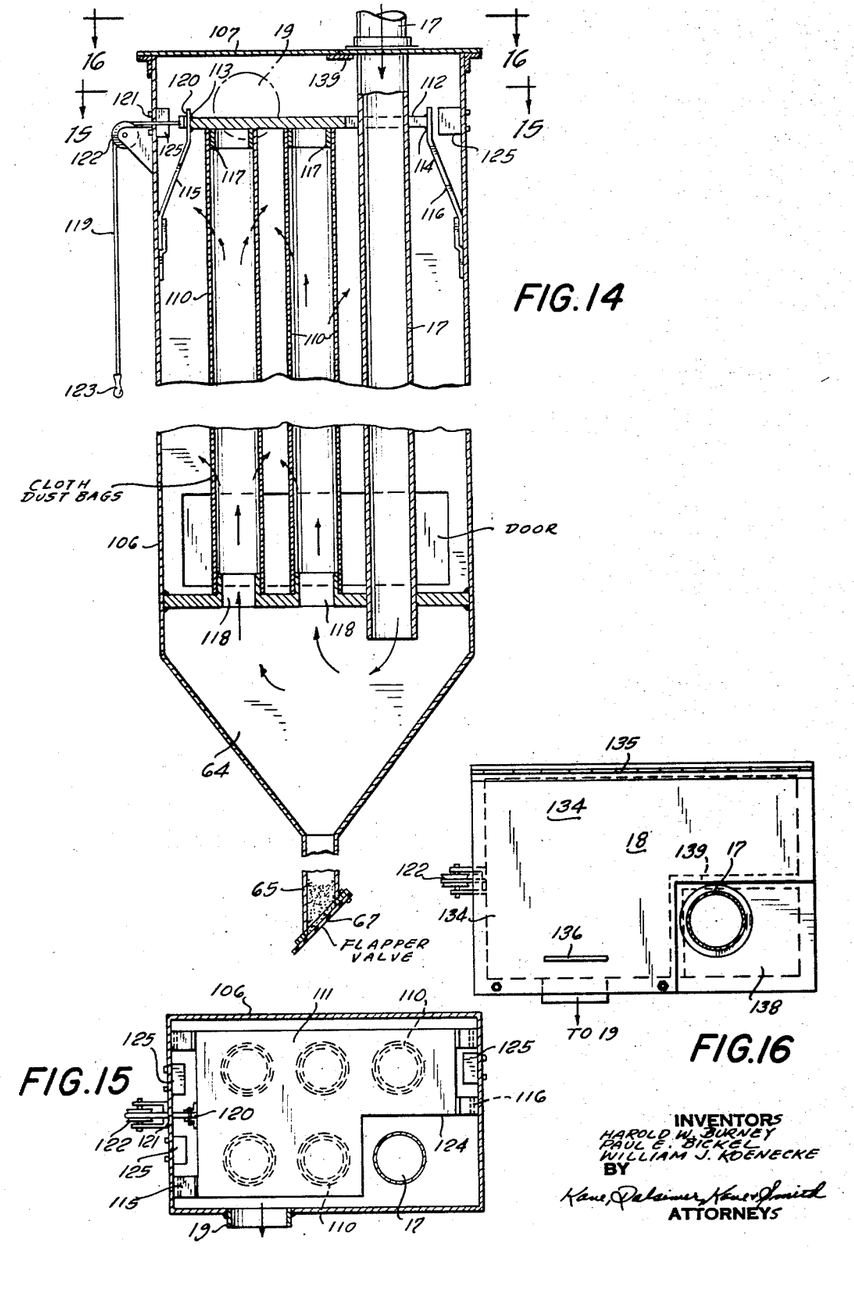
FIG. 14 is a sectional view of the dust collector structure of FIG. 1, particularly to show both the supply and the dust cleaning arrangements.
FIG. 15 is a sectional view through the dust cleaner of FIG. 14 taken along the line 15—15 looking in the direction of the arrows to show particularly the vibration means for dislodging collected dust prior to its discharge.
FIG. 16 is a top plan view of the dust collecting structure of FIG. 14 taken from the plane of the line 16—16 looking in the direction of the arrows particularly to show the cleaning mechanism by which the collected dust is removed.

The dust collector 19 is shown in further detail in FIG. 14. Referring to FIG. 14, the inlet from the separator 16, as provided by the inlet tube 17, directs dirt, dust and the like interiorly of a housing 106. The top of the housing is closed off by a hinged cover plate 107 through which the inlet tube 17 is passed. The lower portion of the housing terminates in a generally funnel-shaped section 64 terminating in a tubular outlet 65 through the flapper valves 67 through which collected materials may be withdrawn. Any incoming dust, dirt and the like entering through tube 17 enters under pressure resulting from that applied at the inlet port 14 and the suction of the blower 19. Through the collector unit and to the outlet to the suction blower 19 there extends a plurality of tubular elements of an air permeable nature which are positioned or suspended within the cleaner to collect any dust or dirt which fails to settle within the conical section 64. The air permeable elements 110 are suspended from a support plate 111 having an opening 112 therein through which the inlet tube 17 is passed. The support plate is carried at its ends 113 and 114 upon flat spring elements 115 and 116 which have one end secured to the interior wall of the housing 106. The flat spring elements 115 and 116 have sufficient resilience to support the plate and the suspended tubular members 110 loosely relative to the side walls of the housing. The interior tubular members 110 are secured or positioned at their upper ends in overlapping relationship to the bushings 117 and, at their lower ends, overlap inlet ports 118.

Dust, dirt and the like drawn into the housing 106 that does not fall immediately into the lower funnel-shaped portion 64 is collected by the tubular members 110 and is removed by a vibration of the members. It then falls interiorly of the tubular housing to be collected in the fashion explained. Such dirt or dust as may collect in the interior of the tubes 110 is normally removed by means of moving the cable 119 up or down thereby to move the support plate 111 against the force of the flat spring element 115 secured at point 120. The cable passes through opening 122' in the wall of the member 106 after passing over the pulley 122. A downward pull on the cable occasioned by grasping the handle 123 will move the plate and the assembly of members 110 laterally within the housing with movement being obtained against the force of the flat spring elements 115 and 116. Thus, several downward pulls on the cable 119 are sufficient to vibrate the tubular elements 110 to the extent required to produce vibration sufficient to dislodge collected dirt. Promptly following a release of the cable, the flat springs return the combination to its original position and location.

Making reference to FIG. 15, the relative layout of the housing 106 and the support plate 111 positioned within it is shown. In this respect, it is worthy to note that the support plate 111 is cut out as in the section 124 so as to accommodate the inlet tube 17 and to provide sufficient movement of the plate in a back-and-forth path to shake dirt or dust from the tubular members 110 without interfering with the inlet tube. The housing has cushioning bumpers 125 formed of suitable resilient material supported on opposite end walls to cushion the movement of the support plate at either end of its travel.

Reverting now to the top plan view of the dust collector 18 as shown in FIG. 16, a hinged cover member is provided to cover the interior region. The cover is hinged along the line 135 and is arranged to be lifted by the usual handle element 136. The cover member is usually cut out as at 137 to permit full opening with the inlet opening 17 in the indicated position. However, the entering tubular member 17 is tightly surrounded by a flat plate 138 and beneath the edges of the cover 134 and the flat plate 131 there is a splice plate 139 to maintain the tight fit with the cover closed.

As can be seen particularly from the layouts of FIGS. 10 through 13 in particularly, a plurality of sorting units for selecting different size shot may be embodied within a single unit. As the invention is constituted, in most operations it is usually sufficient to select between three different and chosen shot sizes. These may have any selected size relationship. For other operations, however, it happens occasionally that shot of different diameter should be used and, therefore, the size segregation and selection must be carried on on a different basis. For this reason, each of the flight and catch pan units as depicted, for instance, by such showings as FIGS. 2, 3, 5 and 7 and the like, are all preferably made removable one with respect to the other in the combined unit as depicted by FIGS. 10 through 13, for instance. In this case, segregating units having flights of selected members with the widths of the flights proportionally to the size shot to be selected and all with the catch pans arranged and fixed thereto by attachment to the central support member can be bodily substituted one for the other. The catch pans, for practically all sorting operations, can be the same size, but the flight widths may vary as above suggested depending upon the size shot to be used. Even though only the flights themselves would require change, nonetheless, it is customary in the assembly and, because of the securement of each of the flights and the catch pans to a central support member, to provide the interchangeability as a complete unit. The sorting apparatus thus described is subject to selection of many and various shot sizes with the substitution of different size elements in the operation.

Many and various modifications of the invention herein described can be readily made without departing from either the spirit or the scope thereof as hereinafter set forth by the appended claims.

Having now described the invention, what is claimed is:

1. Classifier apparatus for sorting and separating shot for use in peening operations comprising
   a central support member,
   a plurality of inner flight members constituting a set, each flight member having one edge secured to the support member and extending outwardly therefrom, said flight members each following substantially the path of a helix starting and ending between the ends of the support member, the plurality of flight members constituting the set being substantially equally angularly spaced and each having substantially equal pitch,
   a catch pan member also having its edge secured to the support member and extending outwardly from the support beyond the edge of the flight members of the set, said catch pan member also extending along a helical path and being interleaved between selected flight members of the set where the first helical turn of one of the flight members is completed and the next turn of the helix of the inner flight members is started and spaced substantially uniformly between said flight members with its inner edge also secured to the support member and having a controlled pitch angle to space the said members from contact while retaining substantially equal separation at the secured edges,
   a distributor means for introducing shot of various classifications and mixtures of round, undersized and partially mutilated into the flight set for sorting and classification, the said shot being adapted to progress along the helical path of the flights between entry position and final discharge position gravitationally and being subject by reason of the helical configuration of the catch pan and flight members to centrifugal force whereby substantially optimum size spherical shaped shot upon being introduced upon the flights roll relative to the flight and catch pan so that substantially perfect shot pass over and beyond the edge of the flight members to the catch pan to the exclusion of non-spherical units and shot of substantially spherical shape will roll along the catch pan in the region near its edge of attachment and imperfect shot will be retained substantially within the inner area of the nested set, and
   separate means at the lowermost portion of the helical path for collecting shot of the aforesaid various classifications.

2. The apparatus claimed in claim 1 comprising, in addition,
   an upstanding rim secured to the peripheral edge of the catch pan remote from the central support and extending in a direction parallel to the support axis to prevent shot from leaving the catch pan at any point between the start and end of the helical path.

3. The apparatus claimed in claim 2 comprising, in addition,
   means for terminating the helical path of each member of the flight set and of the catch pan at substantially the same region.

4. The apparatus claimed in claim 3 comprising, in addition,
   means at the termination of said helical paths to segregate substantially the spherical from non-spherical shot at the catch pan,
   means for collecting the so-segregated shot, and
   means for collecting non-spherical shot remaining on the flight path of the set at the end of the helical path.

5. The apparatus claimed in claim 4 comprising, in addition,
   a barrier at the terminating end of the helical flight paths for retaining articles remaining thereon separate from material reaching the catch pan, and
   transfer means to remove all material following the path of the flights and the catch pan from the supply point to the end of the helical path.

6. Classifier apparatus for sorting and separating shot for use in peening operations comprising
   a storage hopper element adapted to receive shot for classification including therein means for screening contaminants of sizes generally larger than the shot to be sorted,
   a cleaning unit,
   means for supplying shot from the storage hopper to the cleaning unit, said cleaning unit providing means for removing the dirt and dust from the shot mixture supplied,
   a plurality of separator units for separating shot generally as to size,
   means for feeding the shot from the cleaning unit to the separator units,
   means for segregating the shot supplied to the separating units between oversize shot, a plurality of selected size ranges, and undersize shot and refuse,
   a plurality of storage hoppers for storing shot of each selected size separated by the separating unit,
   a plurality of classifying units each comprising a plurality of flight members each substantially uniformly spaced,
   a central support element for all of the flight members,
   means for feeding the shot from each storage unit to a therewith associated classifying unit, the flights of said clasifying unit each having one edge secured to the central support means and extending outwardly from the support to form a shot-separating path, the flight path of each flight following substantially a helical path from an uppermost to a lowermost position, the several flight members constituting a set and each flight being uniformly separated from each other flight and each having a substantially like helical pitch between their top and bottom and each equiangularly spaced from each other,
   a catch pan member also secured to the central support member and extending outwardly therefrom beyond the extent of flight members, the catch pan also following a substantially helical path and being arranged to segregate each convolution of the flight paths from each other and being positioned and supported from the central support means to start at approximately the completion of the first turn of the uppermost member of the flights and to be located following the lowermost section of the flight element in the same convolution, and
   means at the end of the flight path for collecting shot segregated by the flight between usable and non-usable or shot selected for rerun for separation purposes.

7. Shot segregating and storing apparatus comprising,
a classifier element,
a cleaner element for separating dirt and dust from the shot,
means for introducing shot for classifiication into the cleaner element and means for withdrawing shot from the cleaner element and delivering it to the classifier element,
classification means for delivering shot from the classifier element to the separator means,
separator means for segregating the shot substantially along a spiral path for segregation between spherical, non-spherical and approaching spherical classifications,
a collector means assembly for the dust and dirt separated,
means within the collector for withdrawing dirt and for absorbing excess introduced dirt, and
resilient means for discharging collected excess dirt into an outlet.

8. The apparatus claimed in claim 7 comprising, in addition,
resilient means for supporting the assembly means,
means for moving the collector means assembly against the resilient force of the said resilient means whereby, with release, said means is adapted to vibrate laterally within the apparatus, and
stop means for limiting the lateral movement.

References Cited
UNITED STATES PATENTS

| | | | |
|---|---|---|---|
| 1,515,776 | 11/1924 | Krussow | 209—112 |
| 1,542,155 | 6/1925 | Lyman | 209—112 |
| 2,724,498 | 11/1955 | Beresford | 209—112 |

ALLEN N. KNOWLES, *Primary Examiner.*

UNITED STATES PATENT OFFICE
CERTIFICATE OF CORRECTION

Patent No. 3,421,618                                    January 14, 1969

Harold W. Burney et al.

It is certified that error appears in the above identified patent and that said Letters Patent are hereby corrected as shown below:

Column 1, line 49, "seected" should read -- selected --. Column 2, line 66, "moutned" should read -- mounted --. Column 3, lines 31 and 52, and column 4, line 14, "short", each occurrence, should read -- shot --. Column 7, line 5, "extend" should read -- extended --. Column 8, line 7, "path" should read -- paths --. Column 9, line 16, "with" should read -- which --; line 34, "paritcularly" should read -- particularly --. Column 10, line 10, before "interior" insert -- support plate and the other end secured to the --.

Signed and sealed this 10th day of March 1970.

(SEAL)
Attest:

Edward M. Fletcher, Jr.
Attesting Officer

WILLIAM E. SCHUYLER, JR.
Commissioner of Patents